United States Patent [19]

Watson

[11] 4,172,916
[45] Oct. 30, 1979

[54] METHOD OF FABRICATING SANDWICH PANELS

[76] Inventor: Benjamin H. Watson, 1370 Hobart Rd., Southold, N.Y. 11791

[21] Appl. No.: 942,761

[22] Filed: Sep. 15, 1978

[51] Int. Cl.² ............................................. B32B 7/00
[52] U.S. Cl. .................................. 428/86; 156/272; 156/290; 156/291; 156/292; 428/88; 428/119; 428/120; 428/900; 428/913
[58] Field of Search ................. 428/86, 88, 119, 120, 428/900, 913; 156/272, 290, 291, 292

[56] References Cited

U.S. PATENT DOCUMENTS

| 2,502,304 | 3/1950 | Baker | 18/48 |
| 2,714,750 | 8/1955 | Facciolo | 20/4 |
| 2,962,409 | 11/1960 | Ludlow | 428/86 |
| 3,106,503 | 10/1963 | Randall | 428/120 |
| 3,128,544 | 4/1964 | Allingham | 428/86 |
| 3,215,583 | 11/1965 | Holme | 428/86 |

Primary Examiner—Marion E. McCamish
Attorney, Agent, or Firm—Wooster, Davis & Cifelli

[57] ABSTRACT

Sandwich panels comprising a top skin and a bottom skin and a connecting core of a plurality of strand connectors are fabricated by applying viscous liquid core material to one of the skins, providing particles with the viscous core material, and reciprocating the particles between the top and bottom skins to form the strand connectors. The strand connectors are permitted to solidify to complete the formation of the sandwich panel. The particles are preferably of a ferrous metal and are driven between the top and bottom skins by a controlled magnetic field. Compound curved and tubular sandwich panels can be formed by the method.

22 Claims, 11 Drawing Figures

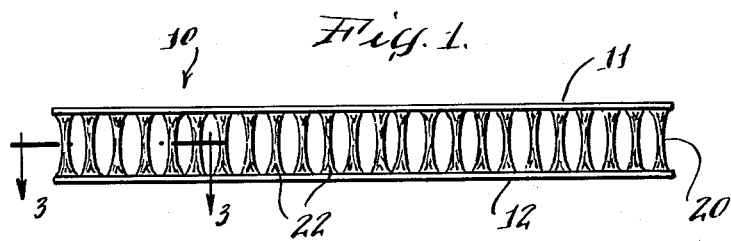
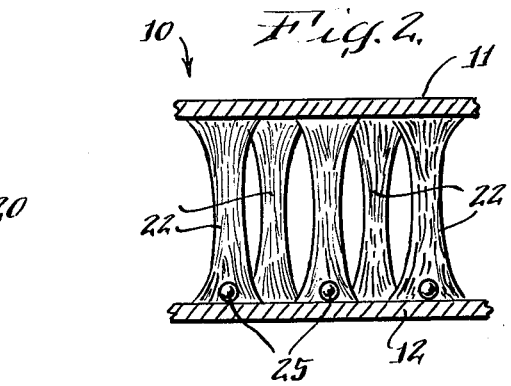
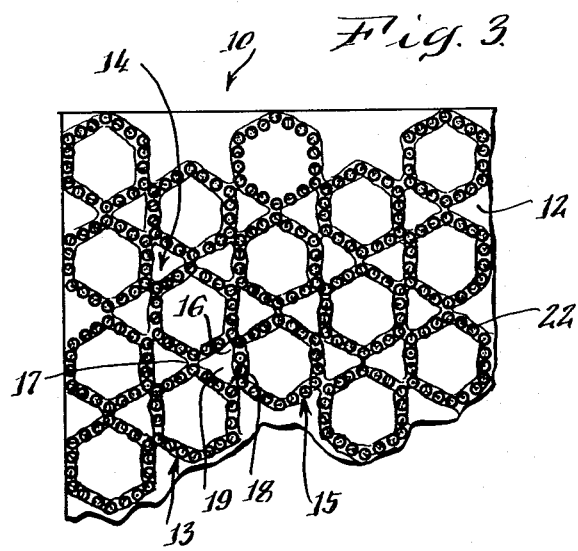
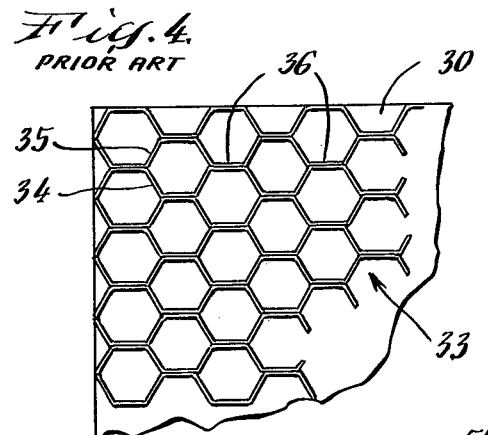
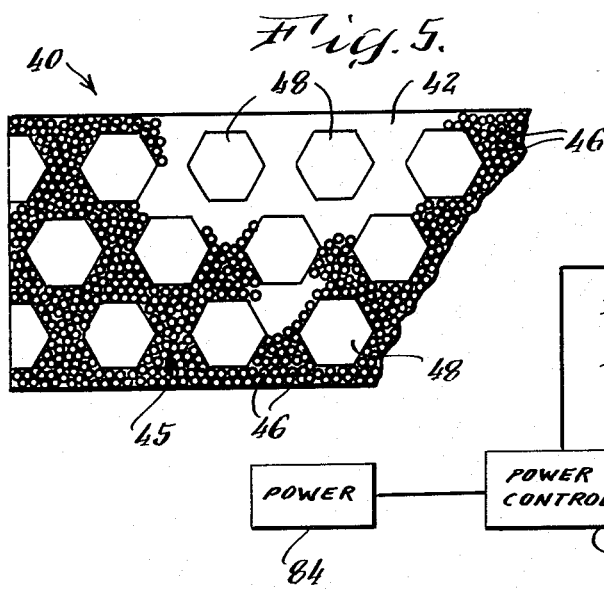
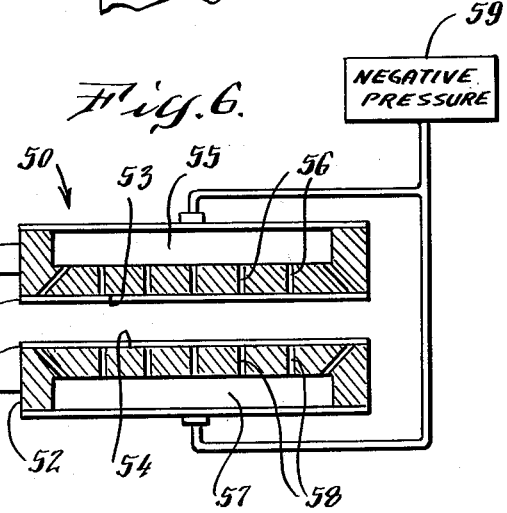
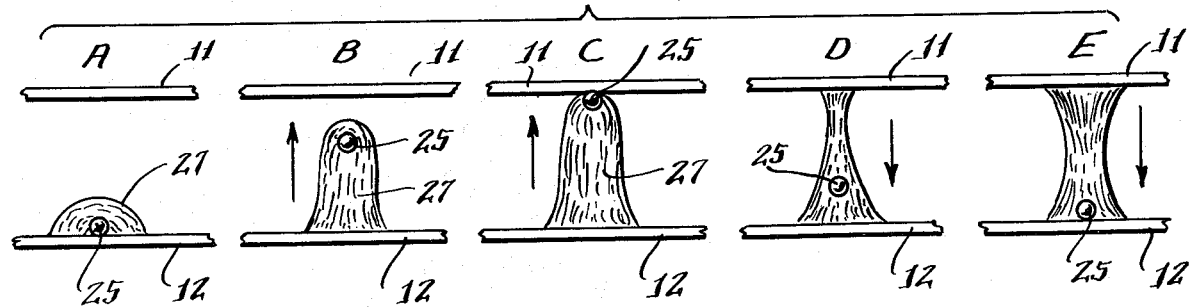

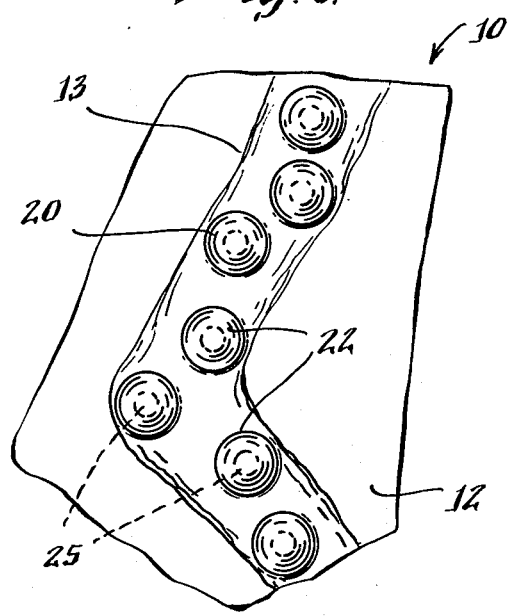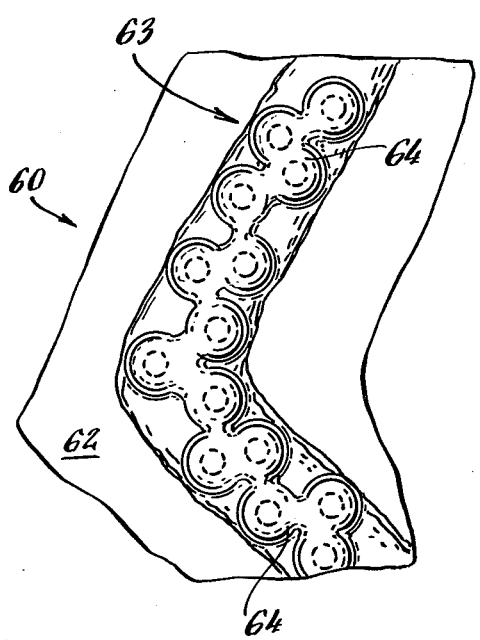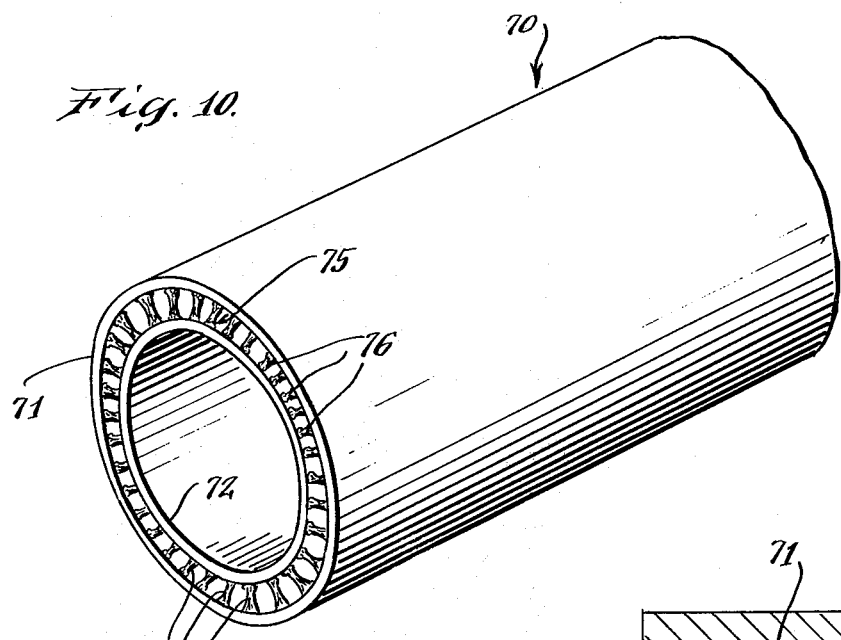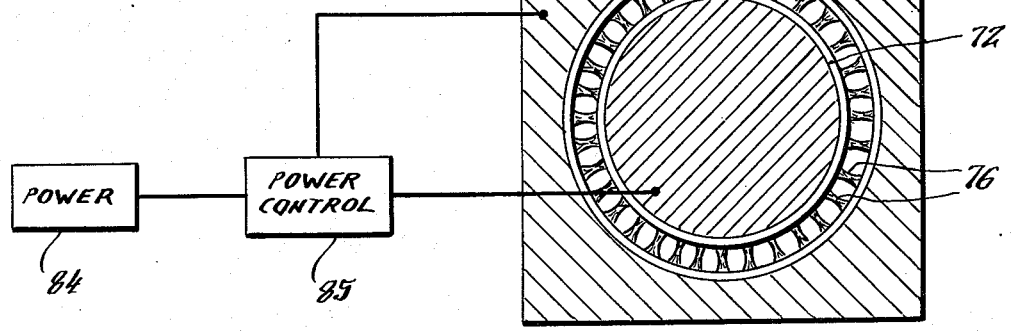

METHOD OF FABRICATING SANDWICH PANELS

BACKGROUND OF THE INVENTION

This invention relates to sandwich panels and to methods of fabricating sandwich panels.

As referrred to herein, the term "sandwich panel" means a composite panel having a top skin and a bottom skin structurally connected by an interposed core, the core being partially hollow, wherein the sandwich panel has high strength and low weight.

In general, prior sandwich panels have incorporated preformed cores to which the top and bottom skins are attached. Examples of prior sandwich panels range from corrugated boxboard for packaging to honeycomb panels for aircraft. Corrugated boxboard is not very strong; it compresses easily and has a tendency to bend along the lines of corrugation. Thus, there is a need for better boxboard, but it must be producible at low cost in order to be a viable replacement for present corrugated boxboard.

The present honeycomb panels used in fabrication of aircraft or other high strength, low weight structures also have disadvantages. The usual method of manufacturing honeycomb panels is to prepare a prefabricated hexagonal cell core. In the fabrication of stainless steel honeycomb panels, this is accomplished by strip welding sheets of metal at spaced apart intervals and expanding the sheets of metal to define hexagonal cells. The resultant hexagonal cell core structure is sliced to the desired core thickness and glued or welded between top and bottom skins to form the final sandwich panel. This method of manufacturing sandwich panels is expensive, for instance, it is too expensive to utilize in making better boxboard for general use. The hexagonal cell core also has "grain", i.e. it bends more easily in one direction than in others, and this is undesirable. Although it is preferable to have a multidirectional hex structure for the core of sandwich panels, a preformed multidirectional hex structure cannot be made except by molding plastic or the like with the desired multidirectional hex orientation. Further, it is difficult to fabricate sandwich panels having simple curves, and exceedingly difficult to fabricate sandwich panels having compound curves with sharp radii of curvature.

Accordingly, there is a need for sandwich panels which can be manufactured less expensively, and yet have the desired properties of high strength and low weight associated with prior art sandwich panels. There is also a need for methods of fabricating such improved sandwich panels.

SUMMARY OF THE INVENTION

It is a principal object of the invention herein to provide improved sandwich panels of high strength and low weight.

It is another principal object of the invention herein to provide an improved method of fabricating sandwich panels.

It is an additional object of the invention herein to provide an improved method of making sandwich panels which do not require a preformed core.

It is a further object of the invention herein to provide an improved method of fabricating sandwich panels which permit a choice of core configuration, including multidirectional hexagonal cores.

It is also an object of the invention herein to provide an improved method of making sandwich panels wherein the sandwich panels may have compound curves and the compound curves can be of small radius.

It is yet another object of the invention herein to provide an improved method of making sandwich panels at low cost.

Sandwich panels are fabricated according to the method of the invention herein by applying core material in a viscous liquid state to at least one of the top or bottom skins, and providing a plurality of particles with the viscous liquid core material. The top and bottom skins are held spaced apart, and the particles are reciprocated between the facing surfaces of the top and bottom skins. The moving particles carry the viscous liquid core material to establish a plurality of strand connectors of the viscous core material extending between the top and bottom skins. The top and bottom skins are maintained spaced apart while the core material solidifies from its viscous liquid state.

In a preferred method, the particles are of a ferrous metal, and the particles are moved between the top and bottom skins by a magnetic field. The magnetic field may be provided by opposed electromagnets, which may be cycled rapidly, but smoothly, to reciprocate the particles between the spaced apart skins until the desired strand connectors are formed. Similarly, the particles may bear an electrical charge and be moved between the spaced-apart skins by an electrical field. The spaced-apart skins may also be mechanically moved to achieve the desired motion of the particles therebetween and to thereby form the connectors.

The core material can be selected from a wide variety of substances which can be provided in a liquid viscous state and which solidify from that state. Examples include plastics which assume a viscous liquid state when heated and are used in that state during formation of the strand connectors, and which cool to a solid state. Viscous liquid adhesives which dry solid may also be used, including those generally known as the epoxies. More esoteric approaches are the use of molten glass or metal, which solidifies as it cools.

The core material and particles can be applied in a continuous layer, resulting in the formation of randomly distributed strand connectors, or the core material and particles can be applied in a pattern such as a multidirectional hexagonal pattern, to achieve a core of a specific desired configuration. The particles can be mixed with the viscous liquid core material before it is applied to the skin, or can be added to the viscous core material thereafter. With a sufficient amount of viscous liquid core material and particles applied in a pattern, the strand connectors may merge to form continuous walls.

Since the core is formed in situ between the spaced apart top and bottom skins, the resultant sandwich panel can have any desired shape, including compound curves of small radii. Tubular sandwich panels can also be fabricated.

The sandwich panel according to the invention herein, fabricated by the above method, comprises top and bottom skins spaced apart by strand connectors of core material, which include the particles used in forming the core. It will be appreciated that the top and bottom skins of the sandwich panel according to the invention herein may be of numerous desired materials, and the invention is applicable to relatively inexpensive sandwich panels such as boxboard and to relatively sophisticated sandwich panels for use in aircraft or the like.

Other and more specific features and objects of the invention herein will in part be obvious and will in part appear from a perusal of the following description of the preferred embodiments and claims, taken together with the drawings.

DRAWINGS

FIG. 1 is a side elevation view of a sandwich panel according to the invention herein;

FIG. 2 is an enlarged side elevation view of a portion of the sandwich panel of FIG. 1;

FIG. 3 is a sectional view, partially cut away, of the sandwich panel of FIG. 1 taken along the lines 3—3 of FIG. 1;

FIG. 4 is a sectional view of a prior art honeycomb sandwich panel;

FIG. 5 is a sectional view of another sandwich panel according to the invention herein;

FIG. 6 is a schematic view of apparatus for performing the method of fabricating sandwich panels according to the invention herein;

FIG. 7 (A-E) is a multipart, progressive view of the formation of a strand connector of the core of a sandwich panel of FIG. 1 by the method of the invention herein;

FIG. 8 is a segmental sectional view, similar to FIG. 3 but enlarged, of the sandwich panel of FIG. 1;

FIG. 9 is a segmental sectional view, similar to FIG. 8, of another sandwich panel according to the invention herein;

FIG. 10 is a side elevation view of a tubular sandwich panel according to the invention herein; and FIG. 11 is a schematic view of apparatus for forming the tubular sandwich panel of FIG. 10, by the method of the invention herein.

The same reference numerals refer to the same elements throughout the various Figures.

DESCRIPTION OF THE PREFERRED EMBODIMENTS

The invention herein relates to sandwich panels and method of fabricating sandwich panels which do not require a prefabricated core.

A sandwich panel 10 according to the invention herein is shown in FIGS. 1-3 and 8. It generally comprises the top skin 11, a bottom skin 12 and a core 20. The core 20 is comprised of individual strand connectors 22 of solidified core material and particles 25 entrained in the strand connectors 22.

The top and bottom skins 11 and 12 can be fabricated of any desired material, including cardboard of various thicknesses, fiberglass, plastic, wood, metal, etc. The core material is an adhesive, plastic, ceramic, metal alloy or any other material which can be provided in a viscous liquid state and which dries, cools or otherwise sets to a solid state during the process of making the sandwich panel. The core material can be reinforced with fibers or fillers, if desired. The particles 25 are preferably of a ferrous metal, but may be of different materials depending upon the method used to fabricate the sandwich panel 10.

FIG. 3 illustrates the multidirectional hex configuration of the core 20 of the sandwich panel 10. It comprises a plurality of individual hexagonal cells, such as hexagonal cells 13, 14 and 15, having their points joined together, as indicated at 16, 17 and 18, to define triangular open spaces 19 extending between the top skin 11 and the bottom skin 12. Thus, the multidirectional hex core has a dense distribution of hexagonal cells, making sandwich panel 10 quite strong.

With reference to FIG. 8, an enlarged portion of hexagonal cell 13 is shown. The strand connectors 22 are positioned closely adjacent each other, and are "lined up" to define the walls of the hexagonal cell 13. The hexagonal cell 13 is not comprised of solid walls, and the sandwich panel 10 thus defines an air passage between its top and bottom skins 11 and 12. FIG. 9 shows a portion of another sandwich panel 60 according to the invention herein in a view similar to FIG. 8. Sandwich panel 60 is similar to sandwich panel 10, having a bottom skin 62 and a top skin (not shown) connected by a core 63 of strand connectors 64 arrayed to define hexagonal cells. However, sandwich panel 60 differs from sandwich panel 10 in that the strand connectors 64 are sufficiently dense that they join with each other to form a continuous wall. Thus, the sandwich panel 60 defines internally closed air pockets, and is not susceptable to air flow therethrough.

It is illustrative to compare the multidirectional hex core of the sandwich panel 10 of FIG. 3 with a prior art sandwich panel, shown in section in FIG. 4. The prior art sandwich panel 30 includes a core 33 connecting a bottom skin 31 and a top skin (not shown). The core 33 is fabricated of individual sheets of metal, such as sheets 34 and 35 which are welded together along edges of individual hexagonal cells, as plurally indicated at 36. The panels 34, 35 and additional panels are welded together flat, and then expanded into the hexagonal cell structure illustrated. The desired core thickness is sliced from the expanded panels to form the core 33, which is attached to the bottom skin 31 and top skin to form the prior art sandwich panel 30. This is an expensive process. In addition, the prior art sandwich panel 30 has "grain" running in direction of the welds between the panels, and accordingly is bent more easily parallel to the grain than across the grain. It can be seen that the density of the hexagonal cells in the prior art sandwich panel 30 is less than the density of the hexagonal cells in the sandwich panel 10 according to the invention herein. Further, good attachment of the core 33 to the skins of sandwich panel 30 is difficult to achieve, and is less effective than the attachment of the strand connectors of the sandwich panels according to the invention herein.

Referring now to FIG. 5, another sandwich panel 40 according to the invention herein is shown. It comprises a bottom skin 42 and a top skin (not shown) connected by a core 45, seen in section. The core 45 is comprised of a plurality of strand connectors 46 each of which includes at least one particle entrained therein. The particles are not visible in FIG. 5, but are similar to the particles 25 shown in the strand connectors 22 of the sandwich panel 10 of FIG. 2. The core 45 defines a plurality of open hexagonal cells 48. The sandwich panel 40 is light weight, both by virtue of the open hexagonal cells 48 and the space between the individual strand connectors 46.

The sandwich panel 10 is fabricated according to the method of the invention herein by applying core material in a liquid viscous state to at least one of the top and bottom skins 11 and 12 and by providing a large plurality of particles with the viscous liquid core material. The top skin and bottom skin are held spaced apart, and the particles are reciprocated between the facing surfaces of the skins, wherein the moving particles carry the viscous liquid core material between the top and bottom skins to establish strand connectors therebetween. The top and bottom skins are held spaced apart while the core material solidifies from its viscous liquid state.

With reference to FIG. 6, an apparatus 50 is shown schematically, the apparatus 50 being used to fabricate the sandwich panel 10. The apparatus 50 generally comprises two electromagnets 51 and 52 having parallel spaced-apart face surfaces 53 and 54. A source of power 84 is provided for the electromagnets, together with power control circuitry 85. A plenum chamber 55 is defined adjacent the electromagnet 51, and the plenum chamber 55 communicates with the surface 53 of the electromagnet 51 through openings 56. The electromagnet 52 is similarly provided with a plenum chamber 57 communicating with its surface 54 through openings 58, and the plenum chambers 55 and 57 are connected with a source of negative pressure 59.

Viscous liquid core material is applied to one or both of the top skin 11 and bottom skin 12 from which the sandwich panel 10 is fabricated. It will be appreciated that applicators are available for applying viscous liquid materials to surfaces in patterns, such as the multidirectional hex pattern generally illustrated in FIG. 3. Ferrous metal alloy particles 25 may be premixed with the viscous liquid core material, or may be placed on the viscous liquid core material after it is applied to the top skin or bottom skin 11 or 12. It will further be appreciated that the core material can be applied in a relatively solid state, such as in a sheet of ceramic plastic or glass, and then heated to a viscous liquid state when it is desired to form the core. The particles can also be "preapplied". As an example, in forming boxboard sandwich panels, a cardboard-plastic laminate can be prepared with particles in the plastic, and the plastic heated to a viscous liquid state just prior to core formation.

The top skin 11 is positioned on the surface 53 of the electromagnet 51, and the bottom of the skin 12 is positioned on the surface 54 of the electromagnet 52. If the viscous liquid core material has been applied in a pattern to both the top and bottom skins, care must be taken to align the patterns. The source of negative pressure 59 is utilized to partly evacuate the plenum chambers 55 and 57 wherein the top skin 11 and bottom skin 12 are held to their respective electromagnets 51 and 53 by suction.

The electromagnets 51 and 53 are operated to reciprocate the particles 25, carrying viscous liquid core material, between the top skin 11 and the bottom skin 12. The power control 85 preferably first establishes a stronger attractive magnetic field in a first one of the electromagnets adjacent the skin having the core material and particles thereon, and if the core material and particles are on both skins, the magnetic field is gradually increased in one electromagnet to place all the particles adjacent one skin. The power control next simultaneously decreases the attractive magnetic field of the first electromagnet and increases the attractive magnetic field of the opposed electromagnet. Thus, the particles are moved smoothly at a generally controlled velocity from one skin to the other. The power control cycles in this manner to reciprocate the particles between the skins until the strand connectors 22 are formed. The number of cycles required varies with the viscosity of the core material, the distance between the skins, the size of the particles, etc., but in general five to twenty-five cycles are usually sufficient to form the strand connectors.

The power control 29 may provide for the automatic cycling of the electromagnets, or that manual control can be utilized. It will be appreciated that the term "gradual" as used in describing the transfer of superior magnetic field strength from one electromagnet to the other may in fact be a rapid and high frequency transfer, but controlled to prevent the particles from "bouncing" back and forth. The particle speed is controlled by the magnetic field strength such that the particles do not "hover" between the skins, but do not pull away from the viscous liquid core material. It will also be understood that the particles travel in substantially straight lines perpendicular to the panels, as uniform and parallel lines of magnetic flux can be attained across narrow gaps between large pole pieces.

FIG. 7 illustrates the progressive formation of a strand connector 22 of the sandwich panel 10. In FIG. 7A, a quantity 27 of viscous liquid core material is positioned on the bottom skin 12, and a ferrous metal particle 25 is entrained therein. In FIG. 7B, the particle 25 is moved upwardly toward the top skin 11, such as by the application of magnetic force, and a portion of the viscous core material 27 follows the particle 25. FIG. 7C illustrates the particle 25 reaching the top skin 11, bringing the viscous core material 27 into contact therewith. In FIG. 7D, the direction of the magnetic field has been reversed, wherein the particle 25 travels downwardly toward the bottom skin 12. However, due to the adhesive quality of the viscous core material 27, a portion thereof remains attached to the top skin 11. FIG. 7E illustrates the particle 25 again resting against the bottom skin 12, having at least partially established a strand connector 22, and preparatory for a repetitious reciprocation between the bottom skin 12 and the top skin 11, or for a waiting period during which the strand connector 22 solidifies. In actual practice, the formation of strand connector 22 may not be as complete as is illustrated in FIG. 7E after only one up and down cycle of particle 25, but repetitious cycling of particle 25 will result in the formation of a relatively thick and uniform strand connector 22, as shown.

The thickness of the strand connectors 22 is a function of the size of the particles, the viscosity of the liquid core material at the time the particles are reciprocated, and the distance between the top and bottom skins. No particular preferences can be given, as a preference depends upon the type of sandwich panel required. However, copper clad steel shot, known as "BBs", and which are approximately 0.175 inch in diameter, are excellent for forming relatively large, well-defined strand connectors. Particles which are no more than metal dust also suffice in some applications.

Once the strand connectors 22 comprising the core 20 of sandwich panel 10 have been established, as described above, the top and bottom skins 11 and 12 are held spaced-apart until the core material solidifies. If the core takes the form shown in FIG. 8, i.e. with space between the strand connectors, air can be forced through the core to cool and/or dry it. The finished sandwich panel 10 may then be removed from the apparatus 50.

It will be appreciated that the method can also be performed with particles 25 carrying an electrical charge, and the apparatus 50 comprising two plates of a capacitor, the polarity of which is rapidly reversed to drive the particles back and forth in forming the strand connectors 22 of core 20. Although the magnetic and electrical methods of moving the particles are far preferred, it is also possible to reciprocate the particles forming the strand connectors by simple mechanical motion, such as by shaking the spaced-apart top and bottom skins 11 and 12.

Referring now to FIG. 8, a tubular sandwich panel 70 is shown. The tubular sandwich panel 70 comprises an outer skin 71 and an inner skin 72 which are connected together by a core 75 comprised of a plurality of individual strand connectors 76 with particles, not shown, entrained therein. The tubular sandwich panel 70 can be formed by the method of the invention using an apparatus 80 schematically shown in FIG. 9. The apparatus 80 simply comprises two electromagnets 81 and 82 having a tubular gap 83 and designed such that lines of magnetic flux extend radially across the tubular gap 83. Power 84 and power control 85 are provided for the electromagnets, as discussed above.

The tubular outer or top skin 71 and the tubular inner or bottom skin 72 are positioned in the gap 83 between the electromagnets 81 and 82 at least one of the inner or outer skins having viscous liquid core material and ferrous metal particles applied thereon. The electromagnets 81 and 82 are operated to form the strand connectors 76 comprising the core 75, in the same manner as described above. The tubular sandwich panel 70 is of particular interest because it would be exceedingly difficult to form with a prefabricated core, but is easily formed by the method of the invention herein.

It will be appreciated that other simple compound curved sandwich panels can be fabricated by providing jigs for holding the skins and by providing magnetic fields with appropriate flux lines. This constitutes a major advantage over prior art sandwich panels and prior art methods of making sandwich panels. Also, cores can be of differing thicknesses at various portions of the sandwich panels, i.e. the spacing between the skins can vary. As an example, the top and bottom skins can be non-planar and non-matingly configured, but can be joined by strand connectors to form sandwich panels according to the invention herein. This also could not be accomplished according to the prior art.

Accordingly, there have been described sandwich panels and methods for making sandwich panels which admirably achieve the objects of the invention herein. It will be appreciated that various changes may be made from the preferred embodiments described herein without departing from the spirit and scope of the invention, which is limited only by the following claims.

I claim:

1. A method of fabricating a sandwich panel comprising:
    (A) providing a viscous liquid core material on one surface of at least one of the top and bottom skins for the sandwich panel, the viscous liquid core material selected to have the capability of solidifying;
    (B) providing a plurality of particles to the viscous liquid core material;
    (C) holding the top and bottom skins for the sandwich panel spaced apart with at least one surface of the top and bottom skins having the viscous liquid core material disposed thereon facing the opposed surface of the other of top and bottom skins held spaced apart therefrom;
    (D) reciprocating the particles between the spaced apart top and bottom skins, thereby establishing a plurality of strand connectors of viscous liquid core material extending between the top and bottom skins; and
    (E) maintaining the top and bottom skins spaced apart while the strand connectors of viscous liquid core material solidify to form a rigid core.

2. The method of fabricating a sandwich panel as defined in claim 1 wherein the step providing a plurality of particles to the viscous liquid core material comprises mixing the particles with the viscous liquid core material.

3. The method of fabricating a sandwich panel as defined in claim 2 and further comprising mixing a fibrous filler with the viscous liquid core material.

4. The method of fabricating a sandwich panel as defined in claim 1 wherein the viscous liquid core material is provided on one surface of at least one of the top and bottom skins in a pattern.

5. The method of fabricating a sandwich panel as defined in claim 4 wherein the viscous liquid core material is provided in a pattern of a plurality of polygonal cells.

6. The method of fabricating a sandwich panel as defined in claim 5 wherein the viscous liquid core material is provided in a pattern of a plurality of hexagonal cells.

7. The method of fabricating a sandwich panel as defined in claim 5 wherein the viscous liquid core material and particles are provided in an amount sufficiently great to form strand connectors which touch each other and define closed walls.

8. The method of fabricating a sandwich panel as defined in claim 4 wherein the viscous liquid core material is provided in a pattern of a plurality of multidirectional hexagonal cells.

9. The method of fabricating a sandwich panel as defined in claim 4 wherein the viscous liquid core material is provided in a pattern defining polygonal areas free from the viscous liquid core material on the surface of the skin.

10. The method of fabricating a sandwich panel as defined in claim 4 wherein the viscous liquid core material is provided in the same pattern on both the top and bottom skins, and the patterns are registered prior to reciprocating the particles therebetween.

11. The method of fabricating a sandwich panel as defined in claim 1 wherein the particles are ferrous metal particles and are reciprocated between the top and bottom skins by the application of a magnetic field.

12. The method of fabricating a sandwich panel as defined in claim 11 wherein the magnetic field is provided by one or more electromagnets.

13. The method of fabricating a sandwich panel as defined in claim 12 employing two electromagnets, and further comprising the steps of positioning one electromagnet adjacent the top surface of the top skin of the sandwich panel and positioning the other electromagnet adjacent the bottom surface of the bottom skin of the sandwich panel, with the viscous liquid core material positioned on at least one of the facing surfaces of the top and bottom skins.

14. The method of fabricating a sandwich panel as defined in claim 13 wherein the step of reciprocating the particles between the top and bottom skins includes controlling the strength of the field of the electromagnets to reciprocate the particles at controlled velocity.

15. The method of fabricating a sandwich panel as defined in claim 13 wherein the step of reciprocating the particles between the top and bottom skins includes controlling the strength of the fields of the electromagnets to control the frequency at which the particles are reciprocated.

16. The method of fabricating a sandwich panel as defined in claim 15 wherein the step above reciprocating the particles between the top and bottom skins of the sandwich panel includes controlling the strength of the fields of the electromagnets to reciprocate the particles at controlled velocity.

17. The method of fabricating a sandwich panel as defined in claim 13 wherein the step of holding the top and bottom skins spaced apart includes securing the top skin to one of the electromagnets and the bottom skin to the other of the electromagnets.

18. The method of fabricating a sandwich panel as defined in claim 17 wherein the step of holding the top and bottom skins spaced apart includes applying suction to hold the top skin to one of the electromagnets and the bottom skin to the other of the electromagnets.

19. The method of fabricating a sandwich panel as defined in claim 1 wherein the particles are provided with an electric charge and the step of reciprocating the particles between the top and bottom skins includes applying an electric field.

20. The method of fabricating a sandwich panel as defined in claim 1 wherein the core material is a thermoplastic and is heated to a viscous liquid state and cooled to a solid state after the formation of the strand connectors.

21. The method of fabricating a sandwich panel as defined in claim 20 wherein the thermoplastic core material is applied to one or both of the top and bottom skins and permitted to solidify, and is reheated to its viscous liquid state prior to reciprocating the particles.

22. The method of fabricating a sandwich panel as defined in claim 1 wherein the core material is an adhesive which is provided on the surface of at least one of the top and bottom skins in a viscous liquid state and is permitted to dry to a solid state after formation of the strand connectors.

* * * * *